United States Patent [19]

Uebayashi et al.

[11] Patent Number: 4,974,307
[45] Date of Patent: Dec. 4, 1990

[54] METHOD OF MAKING AN AUTOMOBILE BODY

[75] Inventors: Yoshitaka Uebayashi, Fukuyama; Hiraku Hayashi, Hakkaichi; Hiromi Kimura, Hiroshima; Takami Nakamura, Hakkaichi; Yoshikazu Fujioka, Higashi-Hiroshima, all of Japan

[73] Assignee: Mazda Motor Corporation, Japan

[21] Appl. No.: 367,154

[22] Filed: Jun. 16, 1989

[30] Foreign Application Priority Data

Jun. 20, 1988 [JP] Japan .................................. 63-151513
Jan. 17, 1989 [JP] Japan ...................................... 1-8897

[51] Int. Cl.⁵ .............................................. B23P 19/04
[52] U.S. Cl. ........................................ 29/460; 427/27; 427/299
[58] Field of Search ...................... 29/460; 427/27, 33, 427/409, 299; 264/233, 341, 255; 428/922

[56] References Cited

U.S. PATENT DOCUMENTS

| 2,887,366 | 5/1959 | Oberdorfer | 264/341 |
| 4,745,012 | 5/1988 | Lo | 427/435 |
| 4,808,361 | 2/1989 | Castro et al. | 264/255 |

FOREIGN PATENT DOCUMENTS

| 2328342 | 12/1974 | German Democratic Rep. | 427/33 |
| 229483 | 12/1984 | Japan | 427/299 |
| 2131723 | 6/1984 | United Kingdom | 427/27 |

*Primary Examiner*—Joseph M. Gorski
*Assistant Examiner*—S. Thomas Hughes
*Attorney, Agent, or Firm*—Thompson, Hine and Flory

[57] ABSTRACT

A method of coating an automobile body which is composed of plastic parts and sheet metal parts is provided. The plastic parts are formed with resin materials in which conductive materials are mixed. The plastic parts and the sheet metal parts are given the coating treatment after the two types of parts are assembled.

6 Claims, 2 Drawing Sheets

METHOD OF MAKING AN AUTOMOBILE BODY

BACKGROUND OF THE INVENTION

1. Field of Invention

This invention relates to a method of coating an automobile body.

2. Description of the prior art

Conventionally, the coating of an automobile body is carried out by four processes; namely, a pretreating process for degreasing, an undercoating electrodeposition coating process for rust-proofing, an additional corrosion-resistance coating process and a final finish coating process for imparting a desirable finish to the treated body.

To produce an automobile which is light in weight, and having superior rust-proofing properties, it has been proposed in recent years to produce a portion of the automobile body with primarily plastic parts, having a lesser amount of sheet metal parts for the remaining parts. In this case, it is required to coat both the plastic parts, as well as the sheet metal parts.

In general, plastic parts useful for automobile body parts have a surface resistivity of around $10^{10}$–$10^{20}$ ohm-cm, which is markedly higher than that of sheet metal parts. It is therefore difficult to provide plastic parts with an electrodeposition coating or an electrostatic coating by using the same process conditions which are used for sheet metal parts.

In view of the above difficulty, several techniques have been suggested. For example, an electrically conductive film (metallic film) can be formed at the surface of a plastic product before coating by non-electrolytic plating and the like (Japanese Patent Application Publication Gazette No. 61-38936). Alternatively, an electrically conductive film can be formed by coating a conductive primer on a plastic product as a coating foundation so as to make electrostatic coating possible. (Japanese Patent Application Laying Open Gazette No. 58-143867).

However, even if these procedures (formation of electrically conductive film) are used on plastic parts of an automobile body as an undercoating, the sheet metal parts must also be undercoated by electrodeposition coating. This means that sheet metal parts and plastic parts are separately given an undercoating treatment, after which both types of parts are assembled for a second coating and a finish coating. The assembling process interposed between the undercoating process and the second coating process is problematical in that the coating film provided on sheet metal parts by the undercoating process may scratch, resulting in a deterioration of the body part. The scratching of the coating film can be reduced or prevented by performing the assembly work more carefully, but the assembly time is unduly prolonged.

Plastic parts are usually lower in heat-resistance than sheet metal parts. Therefore, it is difficult to produce coating films on both plastic parts and sheet metal parts under the same conditions. For example, plastic parts made of PC (polycarbonate) resin or ABS (acrylonitrile butadiene styrene copolymer) resin must be dried (for baking of coating film) at a low temperature (about 90° C., for example) for many hours.

On the other hand, if plastic parts are made of resin materials containing reinforcing fibers, such as glass fiber, heat-resistance can be improved but the smoothness of the surface of plastic parts is worsened by the presence of the reinforcing fibers. The smoothness of the surface is not improved even by the second coating and the finish coating processes.

In the case where plastic parts and sheet metal parts are separately given an undercoating as mentioned above, differences in color tone of the coating films between the two types of materials will remain after the finish coating. Thus, it is difficult to match the color of both types of parts.

SUMMARY OF THE INVENTION

An object of the present invention is, in the case where an automobile body is composed of plastic parts and sheet metal parts, to make it possible to coat plastic parts and sheet metal parts at the same time in an assembled state, beginning with an undercoating process.

For this object, in the present invention the plastic parts are made of resin materials in which electrically conductive materials are mixed in so that the plastic parts and sheet metal parts can be coated at the same time and/or after they are assembled together.

In accordance with one embodiment, a method of coating an automobile body which is composed of plastic parts and sheet metal parts is provided. The method is characterized by forming said plastic parts with resin materials in which electrically conductive materials are mixed and molded, fitting said plastic parts with said sheet metal parts to form an automobile body, and carrying out an automobile body coating treatment including an undercoating process including electrodeposition coating, a second protective coating process and a finish coating process on the assembly.

In this coating method, since the plastic parts are imparted with conductivity by the addition of electrically conductive materials, it is possible to form a coating film on the plastic parts by an electrodeposition coating or an electrostatic coating under the same conditions as the sheet metal parts. More particularly, plastic parts can be dipped in an electrodeposition cell together with sheet metal parts and can be subjected to an electrostatic coating. Taking advantage of this, the present invention enables undercoating, second coating and finish coating processes to be provided to both plastic parts and sheet metal parts which are in an assembled state. Therefore, prior art problems such as coating films being scratched are eliminated, the requirement for using a separate coating production line for exclusive use of plastic parts is obviated and improvements in the productivity and quality of the automobile body can be expected. It is possible to form a hood, a fender panel, a bumper, a trunk lid, a gas cap filler lid, etc. with primarily plastic material in accordance with the present invention.

As resin ingredients of plastic parts, polyester resin, polyamide resin, and polybutylene terephthalate resin, for example, are applicable. As to the above electrically conductive materials, use of carbon is preferable. Use of carbon as an electrically conductive material makes it possible t impart thermal stability to the plastic parts so that the plastic can endure coating film baking temperatures after electrodeposition coating.

Plastic parts can be formed with resin materials in which reinforcing materials, such as glass fibers, are mixed. Such plastic parts will have improved heat-resistance. If baking of a coating film is carried out at a comparatively high temperature in the automobile body coating treatment, improvement of productivity can be expected. The presence of reinforcing materials makes it possible to improve the heat-resistance of the plastic parts and to enable the use of higher baking temperatures.

If the surface resistivity of the plastic resin/electrically conductive mixture is produced to less than $5 \times 10^2 \Omega \cdot cm$, it is possible to form an electrodeposition coating thin film on the plastic parts mixture. In this case, the electrodeposited coating is initially fluid in form and converts into a coating film having a smooth surface upon subsequent heating.

In the embodiment where plastic parts are formed with resin materials in which reinforcing materials are mixed, microscopic discontinuities are generated at the surface of the plastic parts due to the reinforcing materials. The discontinuities can be eliminated by fluidization of the electrodeposited coating.

In addition, since a coating film can be formed by an electrodeposited coating on the plastic portion of the body part, it is possible to match the color of plastic parts to that of the sheet metal parts. Thus, it is easy to make the final color of both parts identical.

A chemical conversion pretreatment process including a prior degreasing step can be incorporated prior to the undercoating process. If a chemical conversion treatment is provided before assembling the plastic parts and sheet metal parts together, there is a fear that the film made by the chemical conversion treatment will be scratched at the time of assembling. This can be prevented by performing a chemical conversion treatment after assembly of the plastic and sheet metal parts. Alternatively, the plastic parts may be fitted with the sheet metal parts after degreasing but prior to chemical conversion.

If the surface resistivity of the plastic resin/electrically conductive material mixture is made in the $5 \times 10^2 - 1 \times 10^6 \Omega \cdot cm$ range, application of an electrodeposited coating to plastic parts at the undercoating process can be prevented. Plastic parts, because of their smooth surface (for example, in the case where they do not contain reinforcing materials), do not require a film to be applied by electrodeposition coating. In this case, applying a film will result in a waste of electrodeposited coating the waste can be prevented by controlling the surface resistivity of the plastic parts.

As stated above, in all cases where a film is formed and where a film is not formed on plastic parts by electrodeposition coating, either one or both of the second coating process and the final finish coating process can be carried out by use of an electrostatic coating method. More particularly, since the plastic parts are imparted with conductivity by the electrically conductive materials, electrostatic coating is made possible. In the case where a film is not formed on plastic parts by electrodeposition coating, utilization of the electrostatic coating method for a second coating process or a finish coating process imparts conductivity.

BRIEF DESCRIPTION OF THE DRAWINGS

The nature and advantages of the present invention will be understood more clearly from the following description made with reference to the accompanying drawings, in which.

DETAILED DESCRIPTION OF THE PREFERRED EMBODIMENT

The present invention is described below with respect to the drawings.

Figure 1:
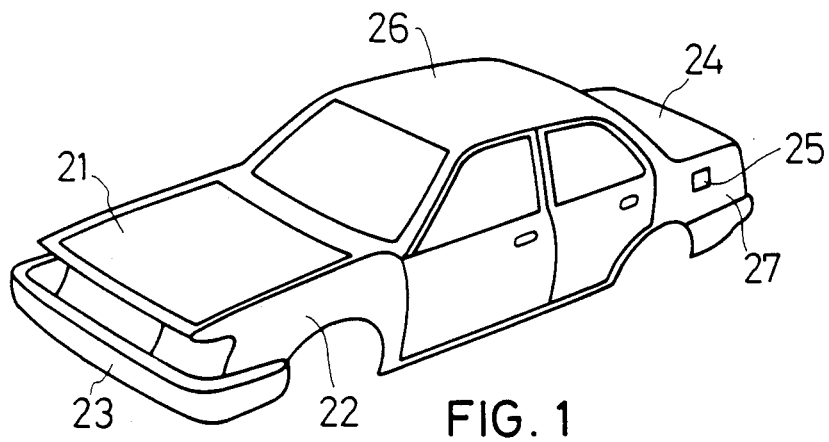
FIG. 1 is a perspective view of an automobile body.

In FIG. 1 showing an automobile body, reference numerals 21, 22, 23, 24, 25, 26 and 27 designate respectively a hood, a fender panel, a bumper, a trunk lid, gasoline cap cover (all of numerals 21-25 representing plastic parts), a roof panel and a rear fender (all of numerals 26-27 representing sheet metal parts).

Figure 2:
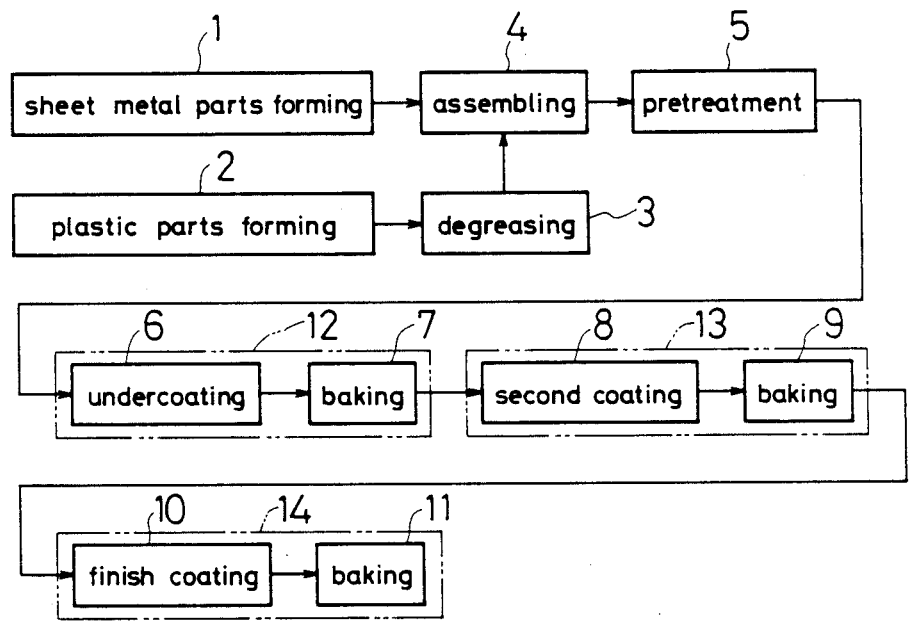
FIG. 2 is a flow chart describing the formation and coating of an automobile body in accordance with the present invention.

The sheet metal parts and the plastic parts are formed separately by respective processes 1, 2, as shown in FIG. 2. Plastic parts are formed from plastic resin materials in which electrically conductive materials are mixed, and are assembled with sheet metal parts at assembling process 4, after degreasing process 3.

An automobile body comprising the assembled sheet metal parts and plastic parts of FIG. 1, is subjected to an automobile body coating treatment and, once coated, is sent to succeeding processes (for example, an engine and suspension assembling process). The automobile body coating treatment comprises an undercoating process 12 (consisting of a pretreatment process 5, an electrodeposition coating process 6 and coating baking 7), a second protective coating process 13 (consisting of a second protective coating process 8 and second coating baking 9) and a final finish coating process 14 (consisting of a finish coating process 10 and finish coating baking 11).

The foregoing describes the automobile body forming and coating in general. Specific examples of the present invention are provided below.

Example 1

This is an example in which plastic parts were formed by the SMC (sheet molding compound) Method in plastic parts forming process 2. More particularly, plastic parts reinforced with fibers were formed by using a sheet of 100 parts of polyester resin by weight, parts of electrically conductive carbon black 38 parts by weight and reinforcing glass fibers. Sheet metal parts were made of steel.

Figure 3:
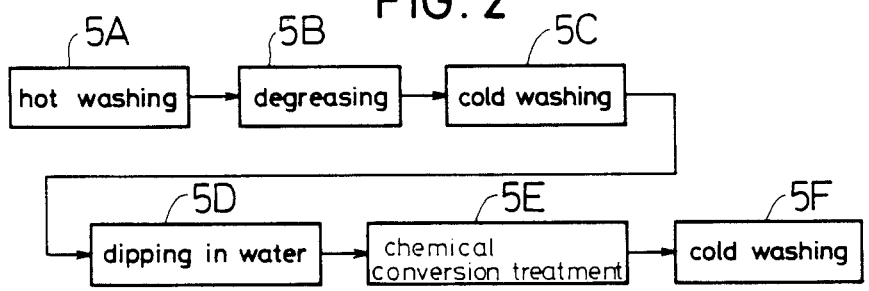
FIG. 3 shows a flow chart of a pretreatment process in accordance with the present invention.

The pretreatment process 5 is used for forming a chemical film on the surfaces of sheet metal parts and plastic parts prior to the coating processes of FIG. 2, and is embodied in FIG. 3. Pretreatment process 5 comprises a hot washing treatment 5A which is carried out by a shower system at 50° C., a degreasing treatment 5B which employs jointly a shower system using an aqueous solution of sodium phosphate and a dipping system, a cold washing treatment 5C using a shower system, a surface adjusting treatment 5D by dipping in water at 23° C., a chemical conversion treatment 5E by dipping in an aqueous solution of phosphate of zinc and a cold washing treatment 5F using a shower system and a dipping system.

The electrodeposition coating 6 of undercoating process 12 was carried out under a voltage of 230V in an epoxy cation electrodeposition cell (30° C.) by dipping the assembled parts into the cell for 2 minutes and 30 seconds. The coating ingredients, comprising 80 parts of pigment/amino denatured epoxy resin and 20 parts water, were applied and substantially uniformly adsorbed on the surfaces of the sheet metal parts and plastic parts to produce a relatively uniform coating film on all parts.

Baking 7 was carried out at 170° C. for 30 minutes. After baking, the undercoating coating film on the sheet metal parts and plastic parts was dried and baked into a continuous film having high adhesiveness. The surface of the plastic parts before the undercoating process 12 was micro-rough due to reinforcing glass fiber materials, but after undercoating process 12, the plastic parts had a smooth surface with no observed surface discontinuities. This is because the coating applied at the coating surface was fluidized and converted during baking into a coating film having a minimal roughness.

In the succeeding second protective coating process 13 and final finish coating process 14, the second protective coating 8, comprising 60 parts pigment/polyester resin/melamine resin/epoxy resin and 40 parts toluene/xylene/ methylisobutyl ketone, and the finish coating 10, comprising 70 parts pigment/alkyd resin/melamine resin and 30 parts toluene/xylene/methylisobutyl ketone, were applied by electrostatic coating, followed by drying 9, 11. Drying in this case can either utilize normal temperature drying (150° C. for 30 minutes for each coating procedure), or baking, depending on the kind of coating selected. Since the undercoating coating films (by means of electrodeposition coating) on the sheet metal parts and plastic parts are the same in coating color, the color of the finished coating of each type of part was almost the same.

Data concerning the surface smoothness of the plastic parts are shown in Table 1.

TABLE 1

| Sample | Surface Sample resistivity ($\Omega$.cm) | Coating film by undercoating Thickness ($\mu$m) | Coating Film by a second coating Thickness ($\mu$m) | Coating film by a finish coating Thickness ($\mu$m) | Surface resistivity (PGD) |
|---|---|---|---|---|---|
| (1) | $10^1$ | 22 | 40 | 40 | 0.6 |
| (2) | $10^{15}$ | 0 | 40 | 40 | 0.2 |

The above data show the smoothness of plastic parts (1) having a surface resistivity of $10^1 \Omega$·cm (high amount of conductive material) and plastic parts (2) having a surface resistivity of $10^{15} \Omega$·cm (relatively low amount of conductive material). The surface resistivities of the plastic parts (1) and (2) were adjusted by varying the contents of the electrically conductive materials in the SMC materials and were measured by the Testing Method JIS (Japan Industry Standard) K6911. PGD (portable gloss distinction), which represents the surface resistivity, is a value representing the degree of distinction of a reflected image. The maximum value of PGD is 1.0 and with the decrease of the PGD value, the smoothness of the surface correspondingly lowers.

From the above data, it can be seen that an electrodeposition undercoating film formed on plastic parts including electrically conductive material is imparted with a smooth surface upon baking, and provides a final smooth surface after application of the second protective coating and the finish coating.

Example 2

This example is to obtain plastic parts by injecting molding of polyamide resin materials in the plastic parts forming process 2 using the same coating materials of Example 1.

In the case of this example, the pretreatment process is the same as in the case of Example 1. In the undercoating process, an automobile body is dipped in an epoxy cation electrodeposition cell and electrodeposition coating is carried out by applying a voltage of 200–400V, with the automobile body acting as the negative pole. Then, after 10 minutes, cold washing is performed and baking is carried out at 180° C. for 25 minutes. In the second coating process, electrostatic coating is carried out by electrically grounding the automobile body and electrifying the epoxy ester coating at $-60-90$KV. 5-10 minutes later, a solvent, a mixture of toluene, xylene and methylisobutylketone is evaporated on the coating and the coating is baked at 140-150° C. for 25 minutes. For the finish coating, an electrostatic coating method is carried out by electrically grounding the car body and electrostatically coating melamine alkyd resin or acrylic resin at $-60-90$KV. 5-10 minutes later, a solvent, comprising a mixture of toluene, xylene and methylisobutyl ketone is applied and evaporated from the body and baking is carried out at 140-150° C. for 25 minutes.

Figure 4:
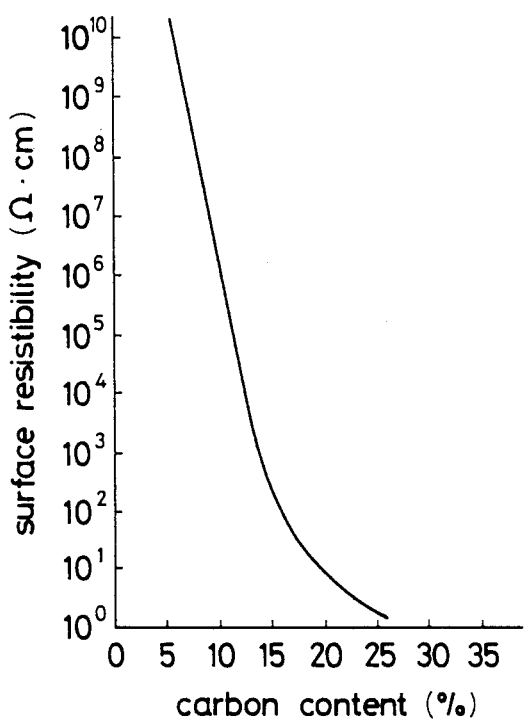
FIG. 4 is a graph showing the relationship between the carbon content and the surface resistivity produced in plastic parts.

Six test pieces, having a surface resistivity of $5.0 \times 10^1$, $5.0 \times 10^2$, $1.0 \times 10^3$, $1.0 \times 10^6$, $1.0 \times 10^8$ and $1.0 \times 10^{10} \Omega$·cm respectively, were prepared. The relation between the carbon content and the surface resistivity of each test piece is shown in FIG. 4. Each test piece was treated under the same condition as the automobile body coating treatment and the treated test pieces were examined for electrodeposited undercoating coating film thickness undercoating, coating efficiency of electrostatic coating at the second coating and finish coating, and adhesiveness of coating film. The results of the test are shown in Table 2.

TABLE 2

| Sample | Surface resistivity ($\Omega$.cm) | Thickness of electrodeposited coating film ($\mu$m) | Coating efficiency of electrostatic coating (%) | Adhesiveness |
|---|---|---|---|---|
| (3) | $5.0 \times 10^1$ | 22 | 45 | Good |
| (4) | $5.0 \times 10^2$ | 0 | 45 | Good |
| (5) | $1.0 \times 10^3$ | 0 | 45 | Good |
| (6) | $1.0 \times 10^6$ | 0 | 40 | Good |
| (7) | $1.0 \times 10^8$ | 0 | 22 | Good |
| (8) | $1.0 \times 10^{10}$ | 0 | 22 | Good |

From the above results, it can be seen that where the surface resistivity is within the range from $5.0 \times 10^2$ to $1.0 \times 10^6 \Omega$·cm, the undercoating coating film by electrodeposition coating is not formed, the coating efficiency of electrostatic paint is comparatively high (40–45%) and the adhesiveness of the coating film to the plastic parts is good.

Figure 5:
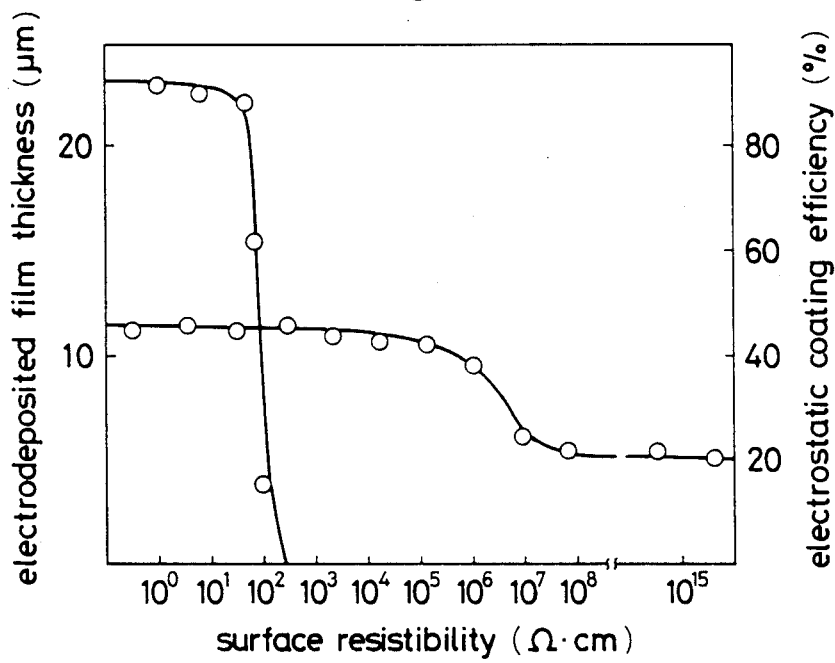
FIG. 5 is a graph showing the relationship between the surface resistivity and the thickness of coating film made by electrodeposition coating and the electrostatic coating efficiency.

FIG. 5 shows the relationship between the surface resistivity of plastic parts made of polyamide resin/electrically conductive materials and the thickness of the electrodeposition coating film on the plastic parts, as well as the coating efficiency of electrostatic coating. The mode of treating the plastic parts is the same as Example 2.

From FIG. 5 it can be seen that a coating film of electrodeposition paint is only formed when the surface resistivity of plastic parts is less than $5.0 \times 10^2 \Omega \cdot cm$ and a coating film of more than 15 μm is obtained when the surface resistivity is less than $8 \times 10^1 \Omega \cdot cm$. It can also be seen that a coating efficiency of around 40% is obtainable when the surface resistivity is less than $1.0 \times 10^6 \Omega \cdot cm$, but if the surface resistivity is higher than that, the coating efficiency lowers (coating efficiency of only around 20% is obtainable if the surface resistivity is more than $1.0 \times 10^7 \Omega \cdot cm$).

Plastic parts made of polyester resin materials and polybutylene terephthalate resin materials (including electrically conductive material) follow substantially the same curve as shown in FIG. 5. The actual measured values of these resin materials showed irregularity of about 1-2% for the electrodeposition coating film and irregularity of about +2-3% for a coating efficiency of electrostatic coating (however, in the case of polybutylene terephthelate resin materials, the surface resistivity was $1.0 \times 10^6 \cdot cm$ and coating efficiency was about −5%). Such irregularity is deemed to be within the range of statistical measuring errors.

Example 3

In this example, six test pieces of plastic parts made of polybutylene terephthalate resin materials in which carbon was mixed at the specified rate (similar to Example 2, to produce surface resistivities of $5.0 \times 10^1$, $5.0 \times 10^2$, $1.0 \times 10^3$, $1.0 \times 10^6$, $1.0 \times 10^8$ and $1.0 \times 10^{10}$ $\Omega \cdot cm$) were prepared. Each test piece was examined for electrodeposited undercoating coating film thickness, coating efficiency of electrostatic coating in second protective coating and finish coating, and adhesiveness of coating film. The results of the test are as shown in Table 3.

TABLE 3

| Sample | Surface resitivity (Ω.cm) | Thickness of electrodeposited coating film (μm) | Coating efficiency of electrostatic coating (%) | Adhesiveness |
|---|---|---|---|---|
| (9) | $5.0 \times 10^1$ | 24 | 46 | Bad |
| (10) | $5.0 \times 10^2$ | 0 | 45 | Good |
| (11) | $1.0 \times 10^3$ | 0 | 45 | Good |
| (12) | $1.0 \times 10^6$ | 0 | 45 | Good |
| (13) | $1.0 \times 10^8$ | 0 | 22 | Good |
| (14) | $1.0 \times 10^{10}$ | 0 | 22 | Good |

Plastic parts made of polybutylene terephthalate resin materials are rather poor in adhesiveness of coating film of electrodeposition coating. Therefore, in the case of plastic parts sample (9) having a surface resistivity of $5.0 \times 10^1$, the adhesiveness of the coating film worsened due to the formation of undercoating film of electrodeposition coating. On the other hand, in the case of plastic parts (10)–(12) having a surface resistivity of $5.0 \times 10^2 - 1.0 \times 10^6$, no undercoating film of electrodeposition coating formed, resulting in a high adhesiveness of coating film of electrostatic coating and a comparatively high coating efficiency (about 45%).

In each of the above examples, a degreasing treatment was applied to the plastic parts before they were assembled with sheet metal parts. The degreasing treatment can be omitted.

Electrically conductive material for each of the above examples was carbon, but carbon can be replaced with aluminum or other conductive materials. Alternatively carbon can be used in combination with other materials.

The foregoing examples are used for explaining the present invention and are not restrictive. All changes in the requirements of claims which are equivalents to the requirements are intended to be encompassed by the claims.

What is claimed is:

1. A method of making an automobile body having a metal component and a plastic component comprising, in order, the steps of:
   (a) forming said plastic component by mixing and molding a plastic resin with an electrically conductive material such that said plastic component has a surface resistivity of between $5.0 \times 10^2$ and $1.0 \times 10^6$ ohm-cm;
   (b) joining said plastic component to said metal component, thereby forming an automobile body assembly;
   (c) applying an undercoating to said automobile body assembly by immersing said automobile body assembly in an electrodeposition cell, wherein said undercoating adheres selectively only to said metal component; and
   (d) applying a subsequent coating to said automobile body assembly by electorstatic coating, wherein said undercoated metal component and said plastic component receive an electrostatic coating film.

2. The method as set forth in claim 1, wherein said electrically conductive material is carbon.

3. The method as set forth in claim 1, wherein said plastic component is selected from the group consisting of a hood, a fender panel, a bumper, a trunk lid and a gasoline tank protective lid, and combinations thereof.

4. The method as set forth in claim 1, wherein said method includes the additional step of chemically pretreating said automobile body assembly, prior to said undercoating step, thereby forming a chemical film on surfaces of said automobile body assembly, said pretreating step including dipping said automobile body assembly in an aqueous solution of phosphate of zinc.

5. The method as set forth in claim 4, wherein said chemically pretreating step includes degreasing said automobile body assembly.

6. The method as set forth in claim 1, wherein said method includes the additional step of degreasing surfaces of said plastic component, said degreasing step occurring prior to joining said plastic component to said metal component.

* * * * *